United States Patent [19]

Gardner et al.

[11] Patent Number: 4,907,748

[45] Date of Patent: * Mar. 13, 1990

[54] FUEL INJECTOR WITH SILICON NOZZLE

[75] Inventors: Robert C. Gardner, Taylor; Joseph M. Giachino, Farmington Hills; William F. Horn, Plymouth; Mark K. Rhoades, Ferndale; Marvin D. Wells, Redford; Steve J. Yockey, Farmington Hills, all of Mich.

[73] Assignee: Ford Motor Company, Dearborn, Mich.

[ * ] Notice: The portion of the term of this patent subsequent to Mar. 3, 2004 has been disclaimed.

[21] Appl. No.: 231,336

[22] Filed: Aug. 12, 1988

[51] Int. Cl.[4] ......................... B05B 1/02; F16K 31/02

[52] U.S. Cl. ................................. 239/584; 239/590.3; 239/596; 239/601; 251/129.06; 251/331; 251/368

[58] Field of Search .................. 239/102.2, 590–590.5, 239/596, 589, 601, 602, 584; 251/129.06, 331, 368; 137/625.38, 625.33

[56] References Cited

U.S. PATENT DOCUMENTS

| | | | |
|---|---|---|---|
| 4,101,076 | 7/1978 | Bart | 239/584 |
| 4,628,576 | 12/1986 | Giachino et al. | 239/102.1 |
| 4,647,013 | 3/1987 | Giachino et al. | 239/102.2 |
| 4,756,508 | 7/1988 | Giachino et al. | 251/368 |
| 4,768,751 | 9/1988 | Giachino et al. | 251/368 |
| 4,808,260 | 2/1989 | Sickafus et al. | 156/644 |

*Primary Examiner*—Andres Kashnikow
*Assistant Examiner*—Karen B. Merritt
*Attorney, Agent, or Firm*—Peter Abolins; Keith L. Zerschling

[57] ABSTRACT

A fuel injector has a silicon micromachined nozzle plate which coacts with a fuel flow valve to control fuel flow out of the fuel injector.

5 Claims, 5 Drawing Sheets

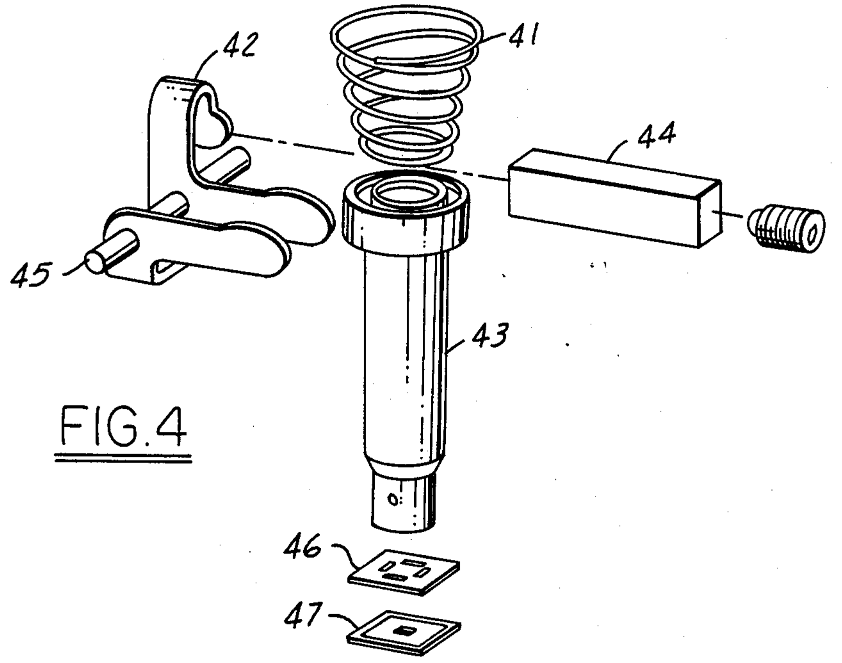
FIG.4
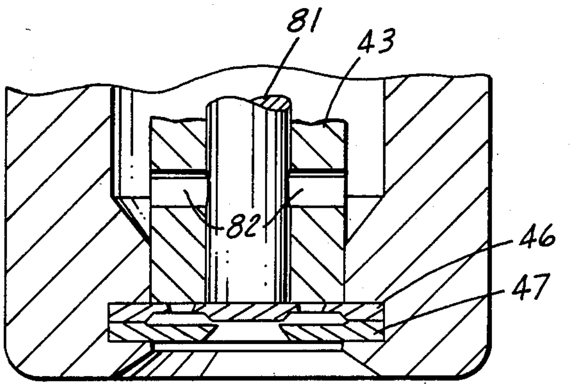
FIG.5A
FIG.5B
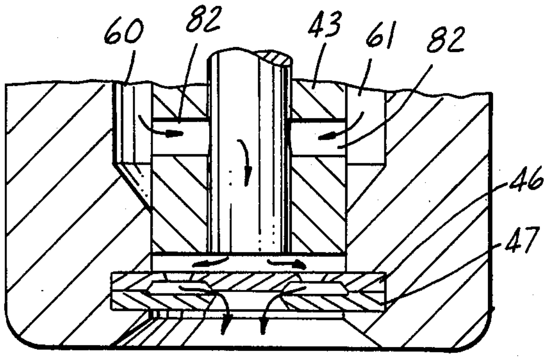

FUEL INJECTOR WITH SILICON NOZZLE

This application is related to U.S. Pat. No. 4,756,508 issued July 12, 1988, having the same assignee as this patent application.

BACKGROUND OF THE INVENTION

1. Field of the Invention

This invention relates to a structure for a fuel injector.

2. Prior Art

The use of carburetors as a fuel metering system on spark ignition engines is rapidly being displaced by the application of fuel injectors. Fuel injection configurations currently used include injection using an injector in the throttle body (central fuel injection) or using an injector for each cylinder (electronic fuel injection). The fuel flow through the fuel injectors is controlled by nozzles having precisely machined metal components. The fuel injectors are actuated by conventional electrical solenoids. Disadvantages of the current design include slow response time, part to part variability, plugging of the fuel path through the nozzle and high cost. It would be desirable to have a fuel injector easily fitted with nozzles which can be easily and precisely formed at a relatively low cost. These are some of the problems this invention overcomes. Various silicon valves are also known as discussed in U.S. Pat. Nos. 4,647,013 and 4,628,576 both having the same assignee as this application.

SUMMARY OF THE INVENTION

This invention includes a fuel injector design using a silicon micromachined nozzle. An injector body supports a fuel connection to pass fuel from a fuel source to the silicon micromachined nozzle. Actuation means responsive to an electric source actuates a valve upstream of the silicon nozzle for controlling fuel flow. That is, the silicon nozzle is used to control the geometry of the fuel spray and maximum fuel delivery rate out of the fuel injector and the upstream valve is to control the flow of the fuel.

The advantage of having the silicon nozzle control the fuel spray is that the silicon can be easily, precisely and relatively inexpensively formed into a very precise pattern which is necessary for defining the fuel flow so that the fuel is desirably atomized. Fuel flow through the silicon nozzle can be shut off using a conventional needle and seat or a micromachined silicon valve plate in combination with the silicon micromachined nozzle plate to form a silicon micromachined valve assembly.

Advantageously, the injector body also supports an elongated piezoelectric driver or stack which changes length in response to applied electrical energy. This change in length can be used to shut off fuel flow through the nozzle. The piezoelectric stack shut off action can be direct or indirect through the use of a lever assembly which amplifies the movement of the piezoelectric stack. The fuel injector can further include an O-ring seal positioned around the injector body and a nozzle seal coupled around the periphery of the nozzle plate. When a silicon valve assembly is used in the fuel injector to control fuel flow, an actuator means can pass through a plunger opening in the valve plate and abut a surface on the nozzle plate to cause relative movement between said nozzle plate and said valve plate.The nozzle plate is free of the valve plate and a return force (e.g. a Belleville washer) is used to close the valve by pressing the valve plate and nozzle plate together. The valve assembly is opened to permit passage of fuel by an actuating force causing the nozzle plate to be spaced from the valve plate.

BRIEF DESCRIPTION OF THE DRAWINGS

FIG. 4 is an exploded perspective view of a piezoelectric driver including a lever assembly for fuel metering control for a fuel injector in accordance with an embodiment of this invention;

FIGS. 5 and 5B are section views of a valve and nozzle in a closed and an open position, respectively, in accordance with another embodiment of this invention;

DETAILED DESCRIPTION OF THE INVENTION

Figure 1:
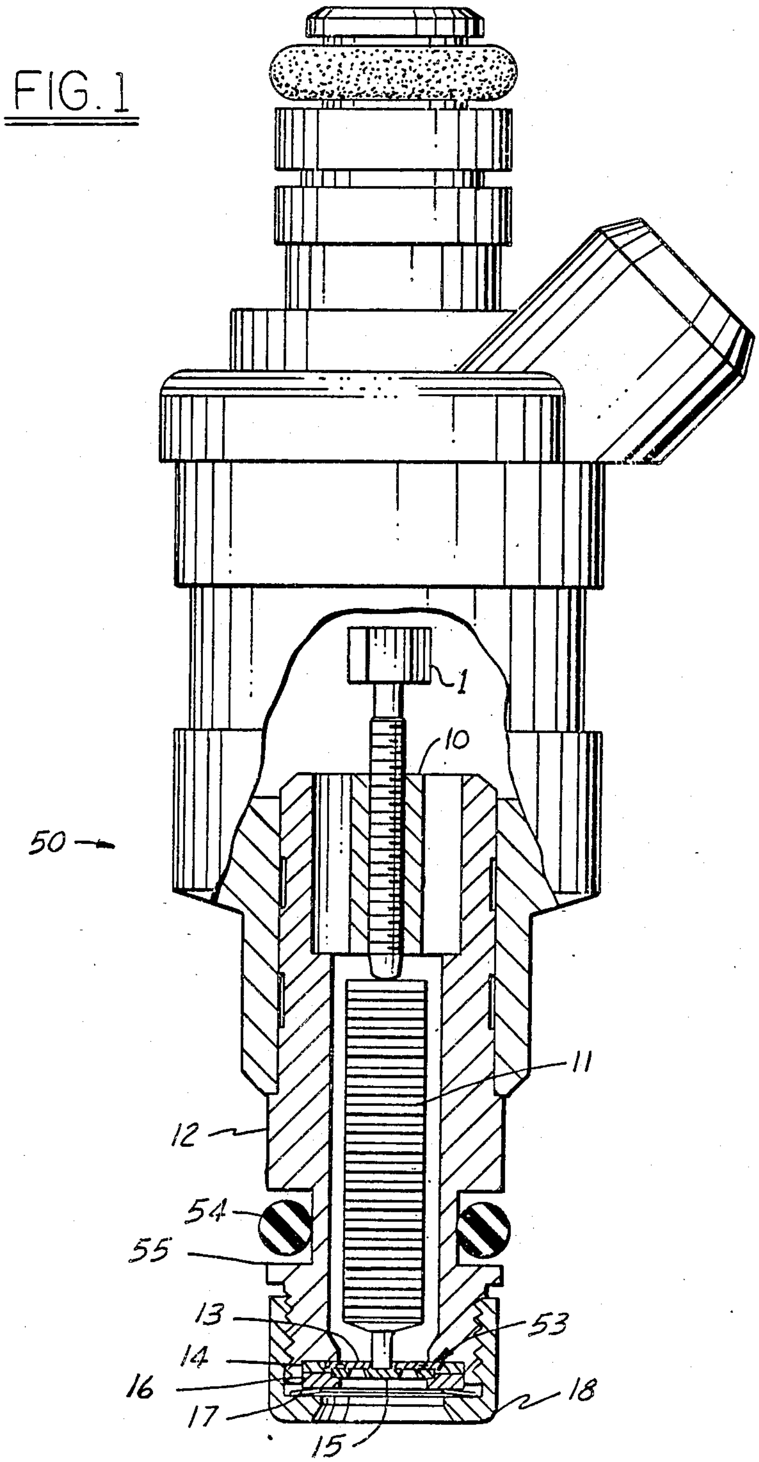
FIG. 1 is a side, partly section view of a floating nozzle fuel injector assembly and package in accordance with an embodiment of this invention.

Referring to FIG. 1, a fuel injector 50 includes a valve assembly 53 including a valve plate 13 and a cooperating nozzle plate 15 which controls the nature of the fuel spray pattern from injector 50. An O-ring seal 54 is positioned around injector housing 12 in a circumferential groove 55. Not shown are connections for supplying fuel to injector 50 and for supplying electricity to actuate a valve within injector 50.

Cooperating with valve assembly 53 is a piezoelectric stack 11 which is used to actuate silicon micromachined nozzle plate 15, thereby metering the amount of fuel that is injected. Piezoelectric stack 11 includes a series of layers similar to a multilayer capacitor. Application of electrical energy to piezoelectric stack 11 causes the stack to expand longitudinally and thus cause movement of abutting nozzle plate 15. Alternatively, it is possible to substitute a solenoid-type actuator for the piezoelectric stack. The solenoid type actuator can also cause longitudinal motion in response to the application of electric energy.

Figure 2:
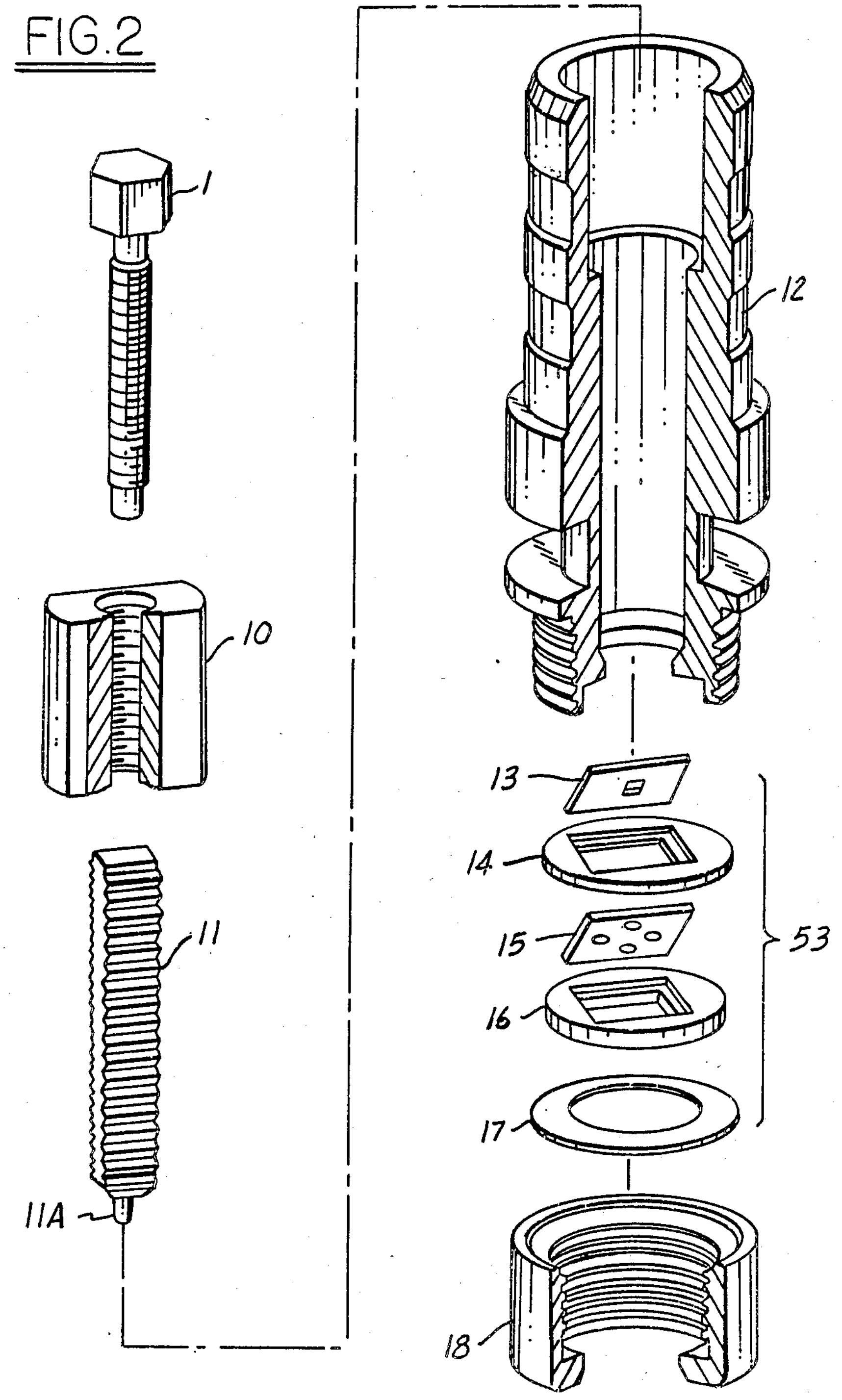
FIG. 2 is an exploded perspective, partly section, view of portions of the injector of FIG. 1.

Referring to FIG. 2, injector housing 12 supports piezoelectric stack 11 under a piezoelectric holder 10 which is adjusted by an adjuster screw 1. Valve assembly 53 is coupled to injector housing 12 by a valve assembly retainer 18. In valve assembly 53, valve plate 13 is coupled to housing 12 and to nozzle plate 15 through a valve seal 14. Nozzle plate 15 is coupled to housing 12 and to a Belleville spring washer 17 by a nozzle seal 16. Nozzle seal 16 is coupled around the periphery of nozzle plate 15 with respect to injector housing 12 at a position for valving action in cooperation with valve plate 13 in response to longitudinal movement by piezoelectric stack 11. Valve seal 14 is coupled around the periphery of valve plate 13 and supports valve plate 13 with respect to injector housing 12.

Nozzle plate 15 is not attached to valve plate 13 and a Belleville spring washer 17 is used to close the valving combination of nozzle plate 15 and valve plate 13. Valve plate 13 is opened by activating piezoelectric stack 11. A plunger 11A passes through valve plate 13 and pushes on nozzle plate 15 to deflect nozzle plate 15 away from valve plate 13, which remains stationary. Such a construction is called a floating nozzle fuel injector design because the two silicon plates are not sealed together along the edges but are maintained in the closed position by Belleville spring washer 17. Valving action does not depend upon the elasticity of the silicon. The closing force supplied by Belleville spring washer 17 can also be applied by an elastomer, a coil spring or other spring means.

Figure 3A:
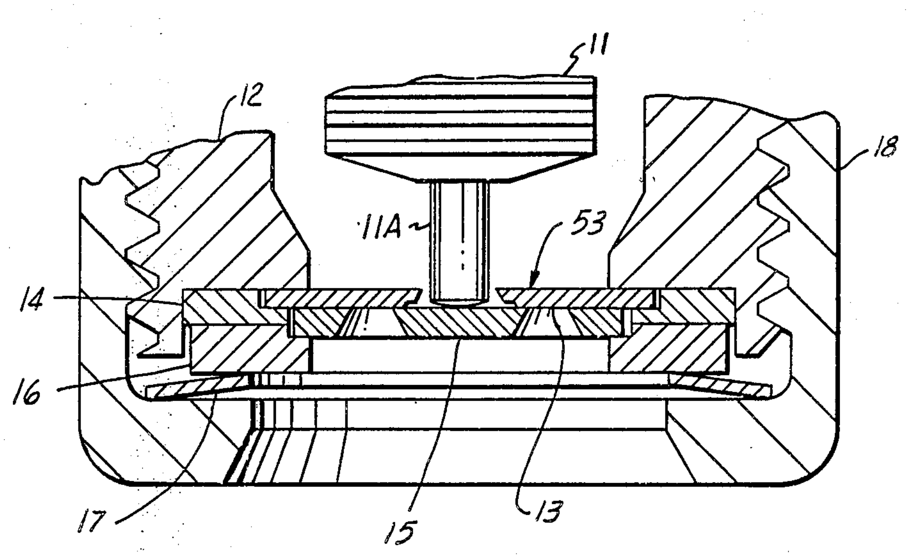
FIGS. 3A and 3B are section views of the nozzle in a closed position and an open position, respectively, in accordance with an embodiment of this invention.
Figure 3B:
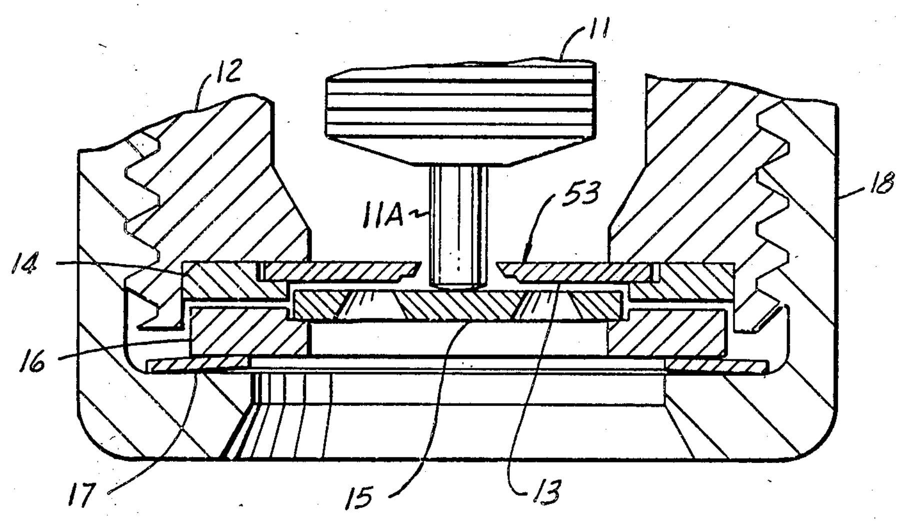

Referring to FIGS. 3A and 3B, as piezoelectric stack 11 expands upon charging in response to application of electrical energy, it overcomes the spring force and opens the nozzle. When opened, both nozzle plate 15 and valve plate 13 are relatively parallel to each other in contrast to being bent as would be the case if the two plates were sealed to each other along their edges. When piezoelectric stack 11 discharges, it returns to its original length and Belleville spring washer 17 forces the nozzle plate 15 against valve plate 13 closing valve assembly 53.

Referring to FIG. 3A, valve assembly 53 is shown closed and the openings of nozzle plate 15 are covered by valve plate 13. An opening in valve plate 13 permits plunger 11A of piezoelectric driver assembly 11 to pass through to nozzle plate 15. As shown in FIG. 3B, when piezoelectric stack 11 is activated and plunger 11A moves downward, nozzle plate 15 is pushed away from valve plate 13 and fluid flow through valve assembly 53 is possible.

Referring to FIG. 4, an exploded perspective view of a piezoelectric driver 44 which couples to a lever assembly 42 rotating about a pivot point 45 thereby applying a force and movement to a flow control valve 43. Flow control valve 43 activates a fluid flow through the combination of flow plate 46 and orifice plate 47 which together combine to form a compound nozzle. A spring 41 is axially aligned with flow control valve 43 to return it to a closed position after piezoelectric driver 44 constricts to its reduced length permitting lever assembly 42 to release flow control valve 43.

Referring to FIG. 5A, the side view of the compound nozzle and flow control valve 43 of FIG. 4 is shown in a closed position. Flow control valve 43 includes a central axial passage 81 and radial passages 82 for passing fuel. Referring to FIG. 5B, the same components are shown in an open position with the valve flow control 43 raised so as to permit fluid flow following flow path 60 and 61.

Figure 6:
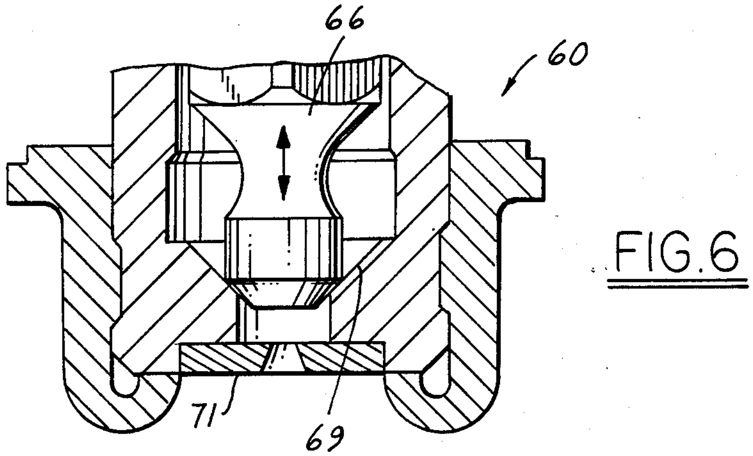
FIG. 6 is a section view of a fuel injector with a single silicon nozzle using a needle and seat fluid flow control valve in accordance with an embodiment of this invention.
Figure 7:
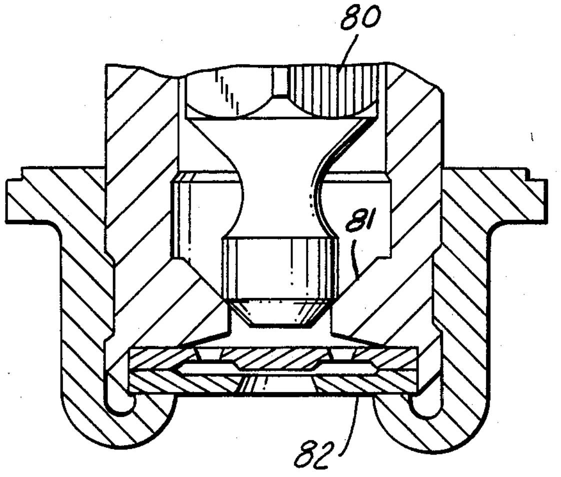
FIG. 7 is a section view of a fuel injector with a compound silicon nozzle using a needle and seat for fluid flow control valve in accordance with an embodiment of this invention.

FIGS. 6 and 7 illustrate silicon nozzles being used to define fuel spray patterns and maximum fuel delivery rates from a fuel injector and fuel flow being controlled by a valve upstream of the silicon nozzle. Referring to FIG. 6, a fuel injector 60 having a needle 66 and a seat 69 controls fuel flow through at a single silicon nozzle plate 71 which defines the spray pattern of the fuel. Referring to FIG. 7, a needle 80 and a seat 81 control fuel flow to a compound nozzle 82 which defines the fuel spray pattern and maximum fuel delivery rate.

Various modifications and variations will no doubt occur to those skilled in the various arts to which this invention pertains. For example, the particular geometric configuration of the valve may be varied from that disclosed herein. These and all other variations which basically rely on the teachings through which this disclosure has advanced the art are properly considered within the scope of this invention.

Silicon machined valves are further described in U.S. Pat. No. 4,647,013, the disclosure of which is incorporated herein by reference.

We claim:

1. A fuel injector with a silicon micromachined nozzle includes:

an injector body for supporting components of the fuel injector:

a fuel connection coupled so as to pass fuel from a fuel source to said silicon micromachined nozzle;

a fuel valve means in the fuel flow path of said silicon nozzle for regulating the flow of fuel;

said silicon nozzle being coupled to said injector body and having an opening for passing fuel downstream of said fuel valve means;

said silicon nozzle being a relatively flat silicon plate having a plurality of openings therethrough for passing fuel wherein each of said openings has sides slated from the perpendicular to the major plane of said silicon nozzle plate; and said silicon nozzle plate including a top silicon plate coupled to a bottom silicon plate, said top plate having a first top opening offset along the major plane of said silicon nozzle plate from a first bottom opening in said bottom plate thereby forming a compound silicon nozzle.

2. A fuel injector as recited in claim 1 wherein said top and bottom silicon plates are spaced from one another in an area between said first top and first bottom openings so as to form a shear gap for fluid flow substantially parallel to the plane of said top and bottom plates.

3. A fuel injector as recited in claim 2 further comprising a second top opening in said top plate offset from said first bottom opening in said bottom plate; top said first and second top openings in said plate being offset from said each other and from said first bottom opening in said bottom plate and acting in cooperation with an area of reduced thickness in said top plate between said first and second top openings so that fluid flow going through a first shear gap adjacent said first top opening hits fluid flow going through a second shear gap adjacent said second top opening and exits through said first bottom opening.

4. A fuel injector with a silicon micromachined nozzle includes:

an injector body for supporting components of the fuel injector;

a fuel connection coupled so as to pass fuel from a fuel source to said silicon micromachined nozzle;

a fuel valve means in the fuel flow path upstream of said silicon nozzle for regulating the flow of fuel;

said silicon nozzle being coupled to said injector body and having an opening for passing fuel downstream of said fuel valve means; and said silicon nozzle including a compound silicon nozzle having a first nozzle plate, with first plate openings therethrough, coupled along a planar surface to a second nozzle plate having a second plate opening therethrough, the first plate openings being laterally spaced from said second plate opening so that said first and second plate openings are not axially aligned and the interface between said first and second nozzle plates has a gap permitting flow from said first plate openings to said second plate opening.

5. A fuel injector with a silicon micromachined nozzle includes:

an injector body for supporting components of the fuel injector;

a fuel connection coupled so as to pass fuel from a fuel source to said silicon micromachined nozzle;

a fuel valve means in the fuel flow path upstream of said silicon nozzle for regulating the flow of fuel;

said silicon nozzle being coupled to said injector body and having an opening for passing fuel downstream of said fuel valve means; and said valve means including a needle and seat valve in the flow path to said silicon nozzle.

* * * * *